(12) United States Patent
Caleffi

(10) Patent No.: US 11,860,647 B2
(45) Date of Patent: Jan. 2, 2024

(54) THERMOSTATIC MIXING VALVE HAVING A COLD WATER OUTLET

(71) Applicant: CALEFFI S.p.A., Fontaneto d'Agogna (IT)

(72) Inventor: Marco Caleffi, Fontaneto d'Agogna (IT)

(73) Assignee: CALEFFI S.P.A., Fontaneto d'Agogna (IT)

(*) Notice: Subject to any disclaimer, the term of this patent is extended or adjusted under 35 U.S.C. 154(b) by 231 days.

(21) Appl. No.: 17/424,250

(22) PCT Filed: Jan. 23, 2019

(86) PCT No.: PCT/IB2019/050567
§ 371 (c)(1),
(2) Date: Jul. 20, 2021

(87) PCT Pub. No.: WO2020/152500
PCT Pub. Date: Jul. 30, 2020

(65) Prior Publication Data
US 2022/0113748 A1    Apr. 14, 2022

(51) Int. Cl.
*G05D 23/13* (2006.01)
*E03C 1/04* (2006.01)

(52) U.S. Cl.
CPC ......... *G05D 23/1346* (2013.01); *E03C 1/041* (2013.01)

(58) Field of Classification Search
CPC ...... E03C 1/041; G05D 23/02; G05D 23/022; G05D 23/13; G05D 23/1306; G05D 23/132; G05D 23/134; G05D 23/1346
See application file for complete search history.

(56) References Cited

U.S. PATENT DOCUMENTS 5,988,514 A   11/1999   Huang
6,315,209 B1  11/2001   Tripp

FOREIGN PATENT DOCUMENTS

DE     10317068 B3    12/2004
WO     WO-2006010880 A1 *  2/2006 ........... F16K 19/003

* cited by examiner

*Primary Examiner* — Jonathan Bradford
(74) *Attorney, Agent, or Firm* — LAUBSCHER & LAUBS

(57) ABSTRACT

A thermostatic mixing valve includes a first cold water inlet, a first cold water outlet, a second hot water inlet, a second mixed cold/hot water outlet, a thermostatic member and a shutter operated by the thermostatic member to ensure that the mixed water is kept at a predetermined temperature. A hollow insert is provided along the first cold water inlet and includes longitudinal fins on the outer wall thereof to obtain two separate coaxial passages, for sending the cold water both directly to the first cold water outlet and to the area for mixing it with the hot water through the shutter to supply the mixed water to the second hot water outlet.

11 Claims, 6 Drawing Sheets

FIG.9
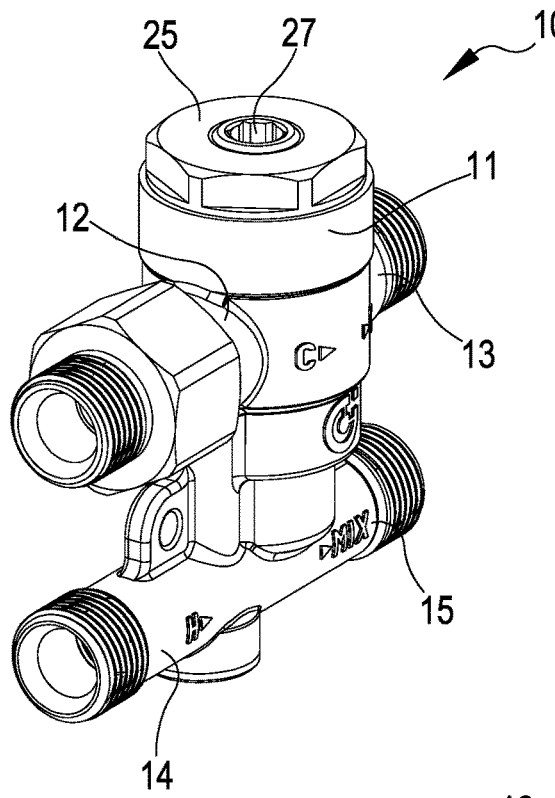
FIG.10
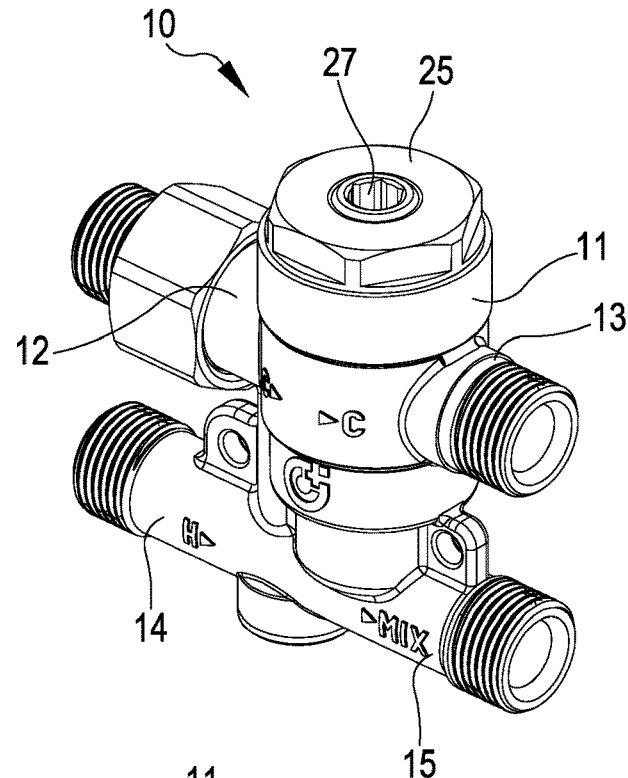
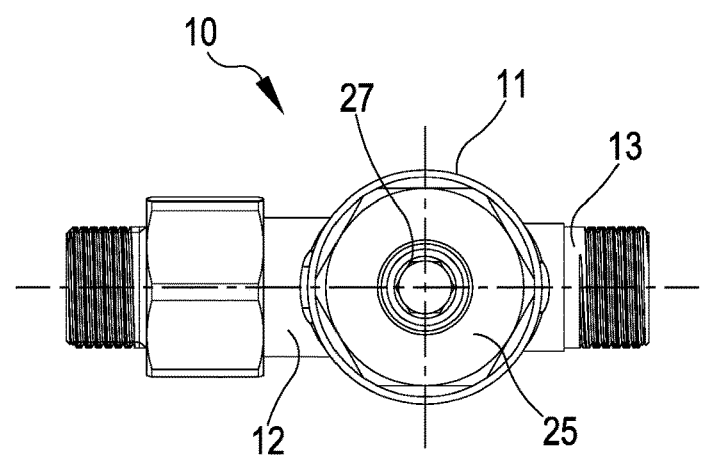
FIG.11

THERMOSTATIC MIXING VALVE HAVING A COLD WATER OUTLET

CROSS-REFERENCE TO RELATED APPLICATIONS

This application is a § 371 National Stage Entry of International Patent Application No. PCT/IB2019/050567 filed Jan. 23, 2019. The entire content of this application is incorporated herein by reference.

BACKGROUND OF THE INVENTION

The present invention relates to a thermostatic mixing valve that can be placed under a sink or under a washbasin.

BRIEF DESCRIPTION OF THE PRIOR ART

In some hot water distribution systems for sanitary use, it is necessary to protect the user from the danger of scalding caused by hot water and from the risk of contracting Legionella, for example in public places such as hospitals and facilities for the elderly, schools, offices, shopping centers, stations in general, airports, and the like.

In particular, thermostatic mixing valves are known, to be placed under a sink or under a washbasin, which provide two inlets, of cold water and hot water respectively, and two outlets, one of cold water, which is not adjustable, and one of mixed water, which is adjustable. Within the mixing valve a shutter and a thermostatic member are provided, which regulate, depending on input temperatures and pressures, the temperature of the mixed water, keeping it constant.

The water being mixed at a predetermined constant temperature avoids the danger of scalding to the user. The possibility of reaching up under the sink or the washbasin with a cold water and hot water piping allows to avoid temperatures at which Legionella has its maximum growth inside the pipes.

Such known thermostatic mixing valves have the drawback of not being particularly compact, despite their need for compactness due to being arranged under the sink or under the washbasin.

Another drawback is the rather high construction cost of such mixing valves, since they are made of brass by means of a casting process with an internal core.

SUMMARY OF THE INVENTION

An object of the present invention is to provide an under-sink/under-washbasin thermostatic mixing valve which is able to overcome the aforementioned drawbacks relating to the compactness and the cost of the mixing valve.

This object is achieved by means of an under-sink/under-washbasin thermostatic mixing valve according to the first claim.

BRIEF DESCRIPTION OF THE DRAWINGS

To better understand the invention, a description of a non-limiting example of embodiment is shown below, illustrated by the attached drawings in which:

FIGS. 9, 10 are two perspective views from different angles of the thermostatic mixing valve of FIG. 1;

FIG. 11 is a top view of the thermostatic mixing valve of FIG. 1.

DETAILED DESCRIPTION

Figure 1:
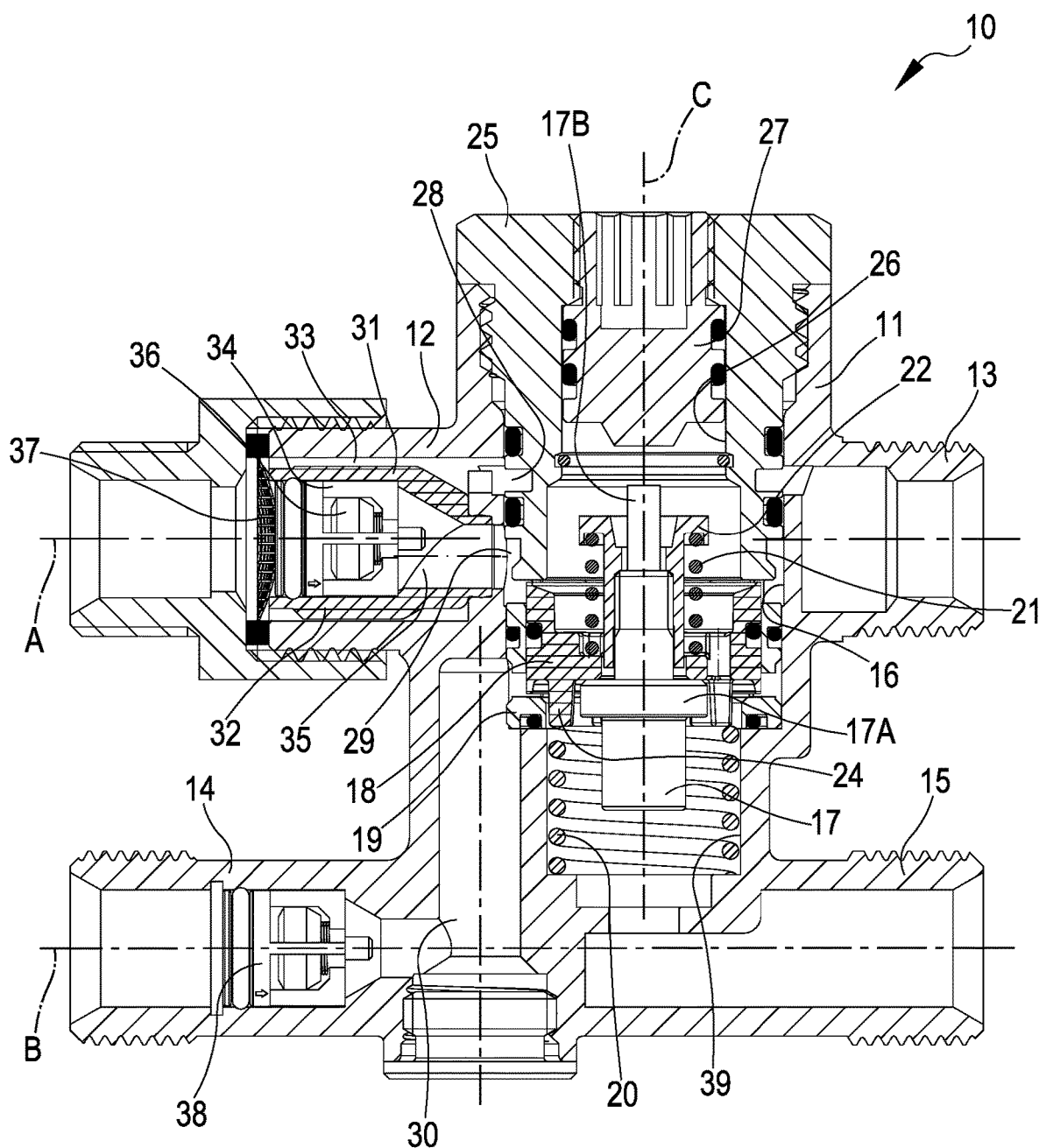
FIG. 1 is a sectional view of an under-sink/under-washbasin thermostatic mixing valve according to the invention.
Figure 2:
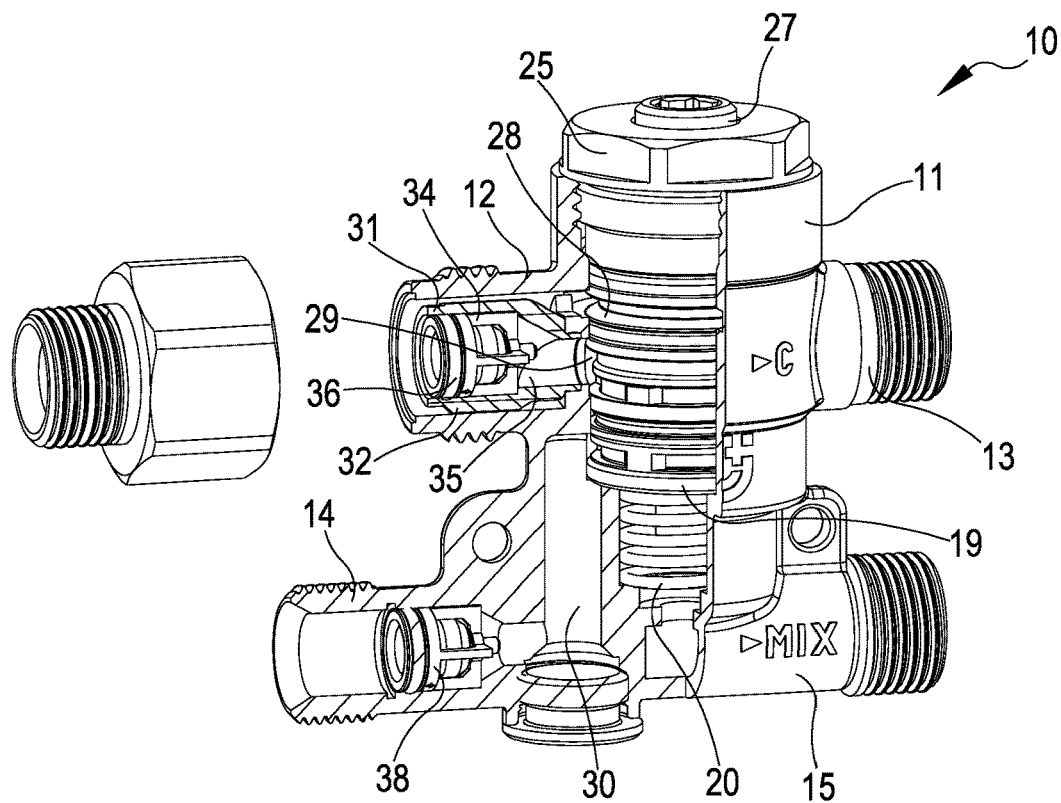
FIG. 2, 3 are two perspective views in partial section view and in partial exploded view of the thermostatic mixing valve of FIG. 1.
Figure 3:
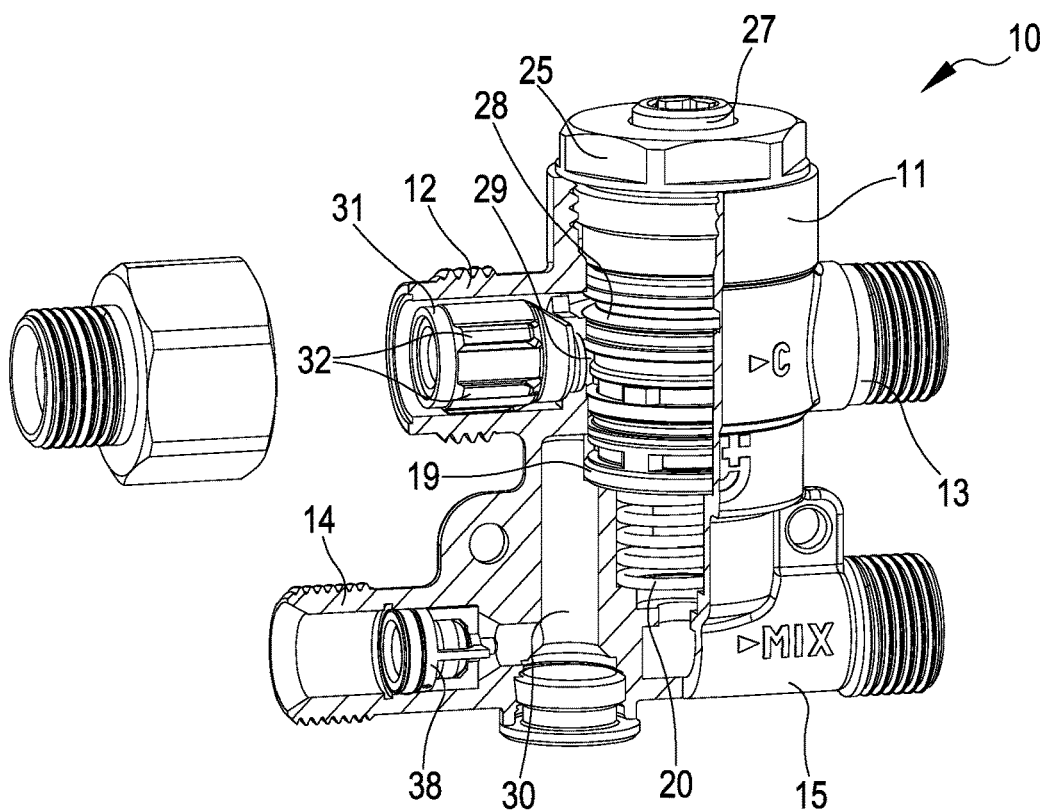

The thermostatic mixing valve illustrated as a whole in FIGS. 1-3, 9-11, which is generally indicated as 10, is intended to be placed under a sink or a washbasin to be connected to a cold water and hot water distribution system at one side and to a sink or washbasin mixer tap at the other side.

The thermostatic mixing valve 10 provides a body 11 in which a first inlet duct 12, a first outlet duct 13, a second inlet duct 14, and a second outlet duct 15 are obtained.

The inlet duct 12 and the outlet duct 13 are arranged along a same axis A, while the inlet duct 14 and the outlet duct 15 are arranged along a same axis B which is parallel to the axis A.

The inlet duct 12 is connected to a cold water piping of the distribution system, while the inlet duct 14 is connected to a hot water piping of the distribution system.

On the other hand, the outlet ducts 13 and 15 are connected to pipings which in turn are connected to the mixer tap of the sink or of the washbasin.

In the body 11 there is obtained a seat 16, extending along an axis C perpendicular to the axis A and the axis B, and open at one side.

A thermostatic member 17 and a shutter 18 coaxially arranged along the axis C are received in the seat 16. The thermostatic member 17 expands and reduces depending on the temperature. The shutter 18 is fitted on the thermostatic member 17 so as to rest on an annular portion 17A thereof, and is slidable within a cage 19 constrained within the seat 16. A helical spring 20 acts on one face of the shutter 18 and reacts on a bottom of the seat 16. A helical spring 21 acts on the other face of the shutter 18 and reacts on a contrasting member 22 fixed to the thermostatic member 17. The spring 21 has a greater elastic force than the spring 20.

The seat 16 is closed by a headwork 25 screwed into the seat 16. The headwork 25 has a central through hole 26 into which a regulating screw 27 is screwed and against the screw 27 an end 17B of the thermostatic member 17 is intended to abut.

The stroke of the shutter 18 is confined between the bottom of the cage 19 and the inner end of the headwork 25.

Figure 4:
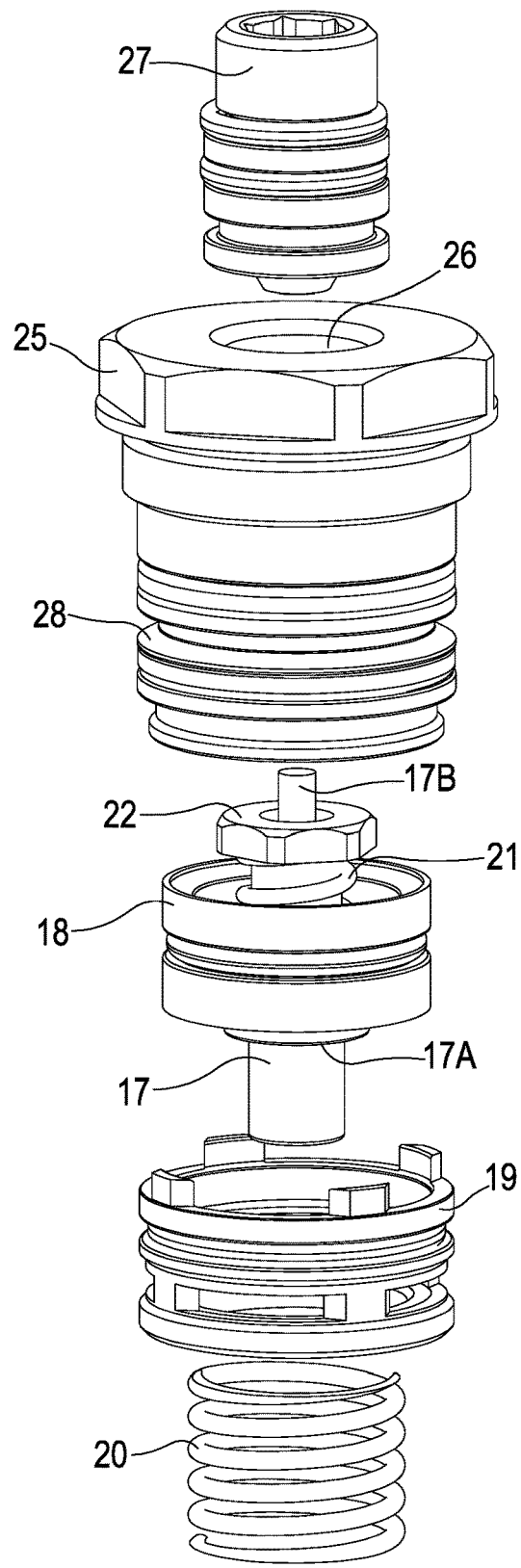
FIG. 4 is an exploded perspective view of some components of the thermostatic mixing valve of FIG. 1.

The thermostatic member 17, the cage 19 and the headwork 25 are clearly visible in FIG. 4.

Figure 5:
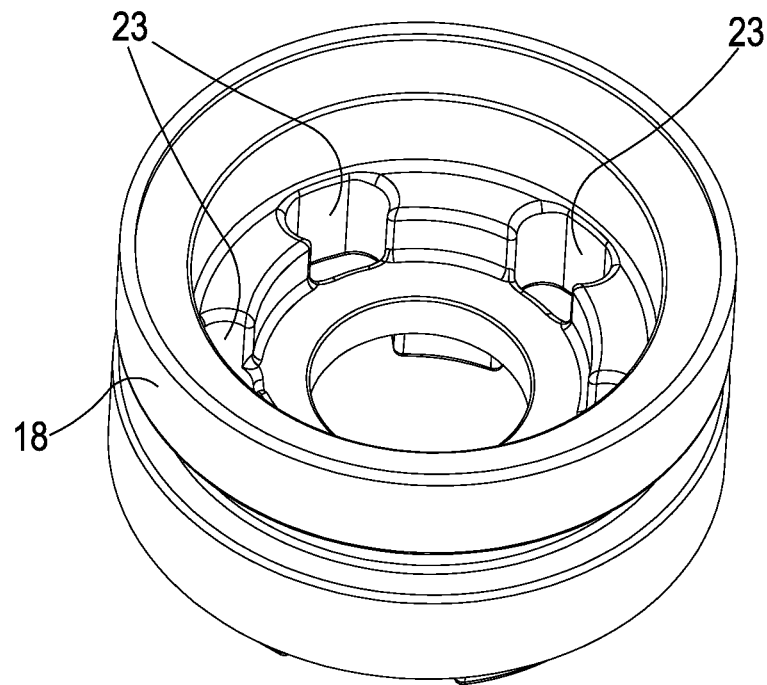
FIGS. 5, 6 are two different perspective views, from above and below, of a component of the thermostatic mixing valve of FIG. 1.
Figure 6:
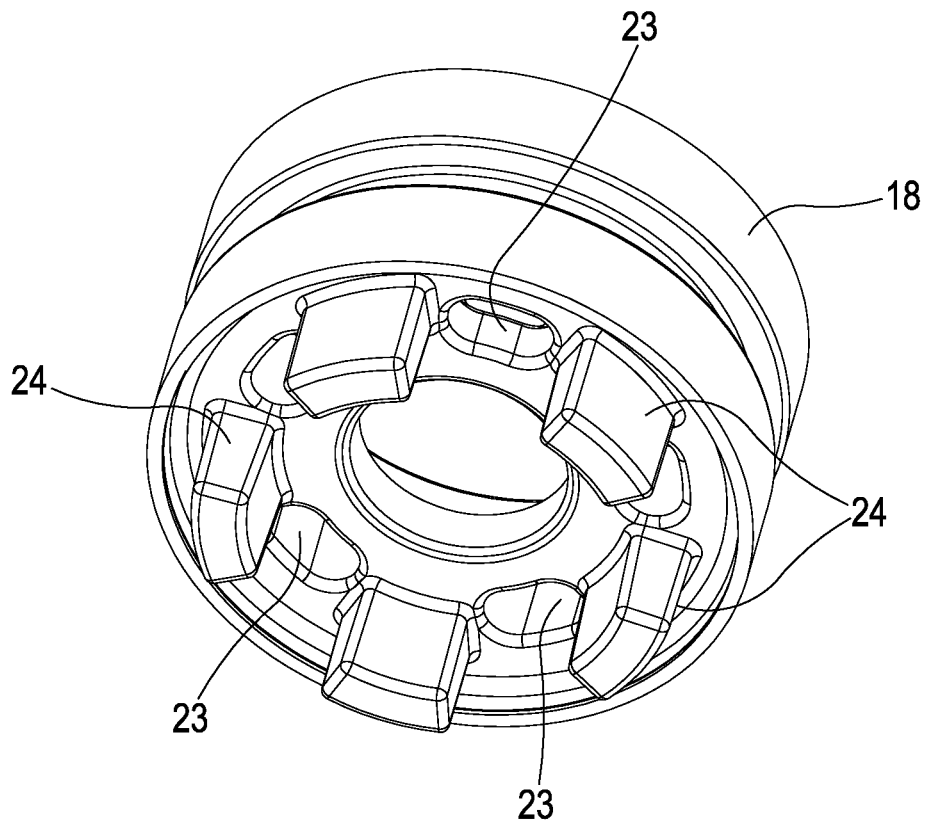

The shutter 18 is illustrated in detail in FIGS. 5, 6, where a series of through holes 23, obtained in the shutter 18, which connect the two opposite faces of the shutter 18, and a series of teeth 24 obtained on one of said two faces, and on which the spring 20 acts, are to be noted.

On the headwork 25, an annular passage 28 is obtained near the walls of the ducts 12, 13, which connects said ducts 12, 13.

Between the wall of the seat 16 and the headwork 25 there is obtained a further annular passage 29 which connects the duct 12 to the seat 16 wherein the thermostatic member 17 and the shutter 18 are received. The annular passage 29 is situated at one face of the shutter 18.

In the body 11 a further duct 30 parallel to the axis C is obtained, which connects the duct 14 to the seat 16 at the other face of the shutter 18.

The seat 16 communicates at its bottom with the duct 15.

In the duct 12 a hollow insert 31 is received, with its axis coinciding with the axis A, externally provided with a series of longitudinal fins 32 which allow to center the insert 31 into the duct 12 and to create an annular passage 33 between the external wall of the insert 31 and the inner wall of the duct 12. The insert 31 has an inner cavity 34 which faces the inlet of the duct 12 at one side, and communicates at the other side with a hole 35 of the insert 31 arranged at the passage 29; the axis of the hole 35 is offset with respect to the axis A. In the cavity 34 a check valve 36 is received, which prevents water from returning from the cavity 34 into the cold water piping of the distribution system. On the side of the insert 31 facing the inlet of the duct 12 a filter 37 is mounted which filters incoming water.

In the duct 14 another check valve 38 is provided, which prevents water from returning into the hot water piping of the distribution system.

Figure 7:
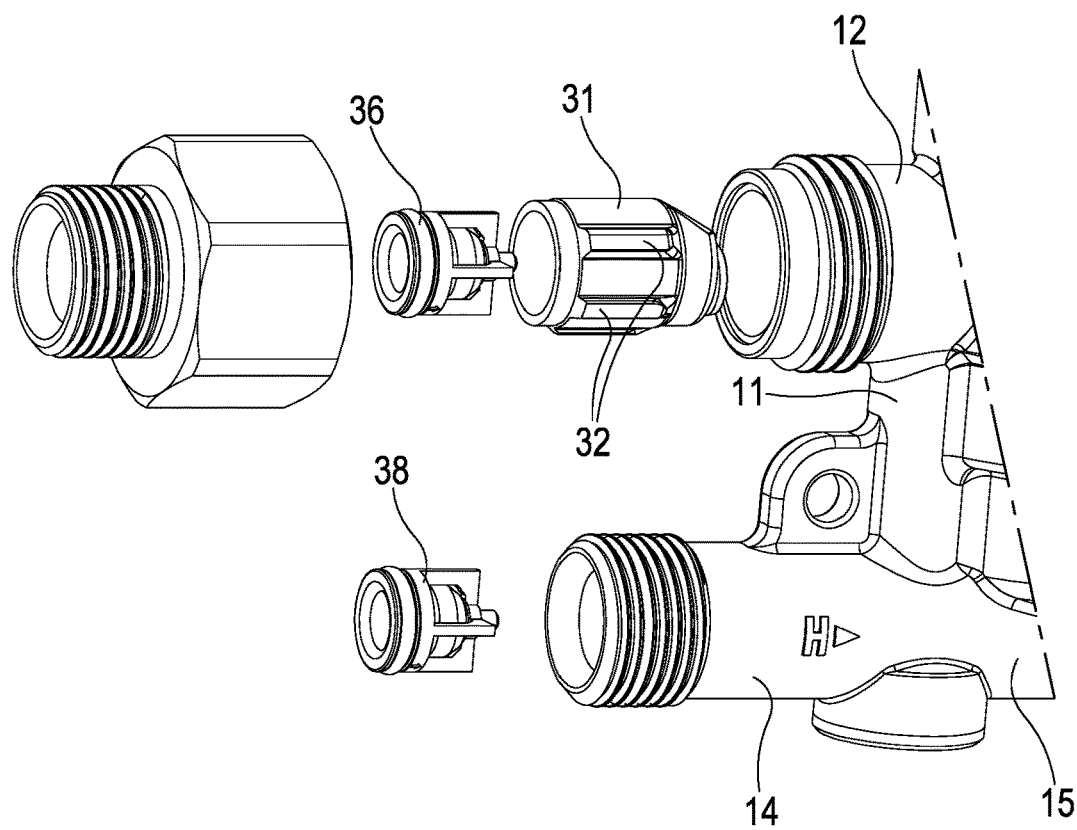
FIG. 7 is a detail in exploded perspective view of the thermostatic mixing valve of FIG. 1.
Figure 8:
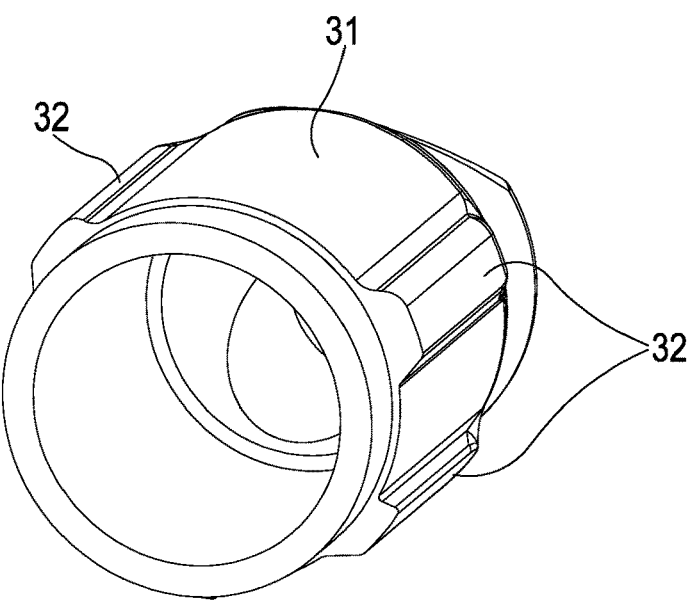
FIG. 8 is a perspective view of a component of the thermostatic mixing valve of FIG. 1.

The insert 31 and the check valves 36, 38 are clearly visible in FIG. 7. In addition, the insert 31 is illustrated in detail in FIG. 8.

With reference to FIG. 1, the operation of the thermostatic mixing valve 10 is as follows.

The cold water coming from the cold water piping enters the duct 12, passes through the filter 37 and is distributed, partly into the annular passage 33 and partly, through the check valve 36, into the cavity 34.

From the annular passage 33 the cold water flows, through the annular passage 28, into the duct 13 from which it comes out to reach the mixer tap. The water temperature at the outlet of the duct 13 corresponds to the temperature of the cold water at the inlet of the duct 12.

From the cavity 34 the cold water flows through the hole 35 and the annular passage 29 towards one face of the shutter 18 and then passes through the holes 23 of the shutter 18 to reach a mixing chamber 39 downstream of the shutter 18, wherein the spring 20 is received.

The hot water coming from the hot water piping enters the duct 14, passes through the check valve 38 and flows through the duct 30, the cage 19, and the passages between the teeth 24 of the shutter 18, to reach the chamber 39 where it mixes with the cold water.

The cold/hot mixed water flows through the duct 15 from which it comes out to reach the mixer tap.

The thermostatic member 17 moves the shutter 18 along the axis C to regulate the inflow of cold water and hot water. At the early stage of the cold and hot water inflow, the spring 20 keeps the shutter 18 in abutment against the headwork 25 preventing the cold water from flowing into the chamber 39, and allowing the hot water to flow into the chamber 39 instead. As the thermostatic member 17 heats up, it expands, and its end 17B abuts against the adjusting screw 27 moving the shutter 18 from its cold water closing position due to the elastic action of the spring 21 which has an elastic force higher than the spring 20.

The shutter 18 is moved until the desired mixing temperature is reached.

The mixing temperature can be preset by rotating the screw 27 so as to modify the abutting point of the end 17B of the thermostatic member 17.

In this way, there is cold water at the outlet of the duct 13, and there is cold/hot mixed water at the outlet of the duct 15, according to what is required for this type of mixing valves to be placed under a sink or a washbasin, as seen in the introduction.

In case of a sudden lack of cold water inflow, the thermostatic member 17 controls the closing of the hot water inlet by the action of the spring 21 which pushes the shutter 18 against the cage 19.

The thermostatic mixing valve 10 turns out to be especially compact, as can be seen by looking at FIGS. 9-11, given its internal geometry with coaxial conveying of the part of cold water not intended for mixing and the part of cold water intended for mixing. In this manner, the thermostatic mixing valve 10 is particularly suitable to be placed under a sink or under a washbasin.

Moreover, thanks to its simple internal geometry, the thermostatic mixing valve 10 can be made of plastic or brass by mould, without the need for a casting process with internal core.

It is clear that variants and/or additions can be provided to what described above and illustrated in the accompanying drawings.

In particular, the shape of the components and the geometry of the ducts and passages may be different from the described and illustrated one. For example, the cold water inlet duct and the cold water outlet duct may not be aligned, and the same applies to the hot water inlet duct and the mixed water outlet duct.

On the outer wall of the hollow insert, instead of the fins, spacer members of any type can be used, which perform the same function as seen.

The thermostatic mixing valve described and illustrated herein can be implemented in other applications, even if it is particularly suitable for being placed under a sink or a washbasin.

The invention claimed is:

1. A thermostatic mixing valve, comprising:
    a body including a cold water inlet duct, a cold water outlet duct, a hot water inlet duct, and a cold/hot mixed water outlet duct;
    a thermostatic member and a shutter operated by the thermostatic member arranged in the body to maintain mixed water from the cold water inlet duct and the hot water inlet duct at a predetermined temperature; and
    a hollow insert arranged in the cold water inlet duct and provided with spacer members on an external wall thereof to form two separate coaxial passages including an annular passage external to the insert and a passage inside the insert, wherein the external passage is in communication with the cold water outlet duct and the internal passage is in communication with the shutter, wherein the hot water inlet duct is also in communication with the shutter for controlled mixing of hot and cold water, and wherein the shutter is also in communication with the cold/hot mixed water outlet duct for the inflow of regulated mixed water to the cold/hot mixed water outlet duct.

2. The mixing valve according to claim 1, wherein the spacer members comprise a series of longitudinal fins.

3. The mixing valve according to claim 1, wherein the internal passage comprises a cavity and an opening of the insert.

4. The mixing valve according to claim 3, wherein the opening has an axis which is offset with respect to an axis of the cavity.

5. The mixing valve according to claim 1, wherein the body includes a first annular passage for communication between the external annular passage and the cold water outlet duct and the body includes a second annular passage for communication between the internal passage and the shutter.

6. The mixing valve according to claim 1, wherein the cold water inlet duct and the cold water outlet duct are arranged along a first common axis, and the hot water inlet duct and the cold/hot mixed water outlet duct are arranged along a second common axis parallel to the first axis.

7. The mixing valve according to claim 6, wherein the shutter is movable along a third axis perpendicular to the first axis and to the second axis.

8. The mixing valve according to claim 7, wherein the hot water inlet duct is in communication with the shutter through a connecting duct parallel to the third axis.

9. The mixing valve according to claim 1, further comprising two check valves located within the hollow insert and within the hot water inlet duct, respectively.

10. The mixing valve according to claim 1, wherein the thermostatic member interacts with an abutment member arranged within the body and adjustable from outside the body to operate the shutter to change the predetermined mixing temperature.

11. The mixing valve according to claim 1, further comprising two calibrated opposing action springs which act on the shutter.

* * * * *